(12) United States Patent
Pradhan et al.

(10) Patent No.: US 7,299,256 B2
(45) Date of Patent: Nov. 20, 2007

(54) CREATING A VIRTUAL LINK BETWEEN A PHYSICAL LOCATION AND ITS WEB REPRESENTATION

(75) Inventors: Salil Pradhan, Santa Clara, CA (US); Jeffrey A Morgan, Cupertino, CA (US); Mark T Smith, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 672 days.

(21) Appl. No.: 09/836,924

(22) Filed: Apr. 17, 2001

(65) Prior Publication Data

US 2002/0152273 A1 Oct. 17, 2002

(51) Int. Cl.
G06F 15/16 (2006.01)

(52) U.S. Cl. .................. 709/203; 709/217; 709/245; 709/246

(58) Field of Classification Search ............... 709/223, 709/225
See application file for complete search history.

(56) References Cited

U.S. PATENT DOCUMENTS

| | | | | |
|---|---|---|---|---|
| 5,173,710 A | * | 12/1992 | Kelley et al. | 342/463 |
| 5,930,474 A | * | 7/1999 | Dunworth et al. | 709/217 |
| 5,930,699 A | * | 7/1999 | Bhatia | 455/456.3 |
| 5,938,721 A | * | 8/1999 | Dussell et al. | 701/211 |
| 6,173,239 B1 | | 1/2001 | Ellenby | |
| 6,332,127 B1 | * | 12/2001 | Bandera et al. | 705/14 |
| 6,381,603 B1 | * | 4/2002 | Chan et al. | 707/10 |
| 6,629,136 B1 | * | 9/2003 | Naidoo | 709/219 |
| 6,714,977 B1 | * | 3/2004 | Fowler et al. | 709/224 |
| 6,792,452 B1 | * | 9/2004 | Philyaw | 709/217 |
| 2001/0054066 A1 | * | 12/2001 | Spitzer | 709/203 |

| | | | |
|---|---|---|---|
| 2002/0085515 A1 | | 7/2002 | Jaynes et al. |

FOREIGN PATENT DOCUMENTS

WO WO00/77662 12/2000

OTHER PUBLICATIONS

Stockus, Arunas, "Web-Based Vehicle Localization," Oct. 2000, IEEE, pp. 436-441.*
Wang, S. S. "E-911 Location Standards and Location Commericial Services," Apr. 2000, IEEE, pp. 1-5.*
Kyong-Ho Kim et al—Managing Scheme for 3-Dimensional Geo-Features Using XML—International Geoscience and Remote Sensing Symposium—vol. 7—Jul. 24, 2000—pp. 2899-2901.

(Continued)

*Primary Examiner*—Jason Cardone
*Assistant Examiner*—Azizul Choudhury

(57) ABSTRACT

A web navigation system includes a virtual link creator that creates an electronic file that contains positional data of a physical location and a web address of a web page associated with the physical location. A virtual link server system receives the electronic file. The server system can transmit the electronic file to any remote receiver system that is near the physical location via a communication network. A receiver system, capable of communicating with the server system and accessing external Internet, receives the electronic file from the server system when the receiver system is near the physical location such that the web address of the web page is virtually posted at the physical location without employing a physical object to host the web address at the physical location. A system for creating such a virtual link is also described. Also described is a system for virtually posting a web address of a web page associated with a physical location.

23 Claims, 9 Drawing Sheets

OTHER PUBLICATIONS

Hiroyuki Tarumi et al—SpaceTag: An Overlaid Virtual System and its Applications—Multimedia Computing and Systems—IEEE International Conference—Jun. 1999—pp. 207-212.

Kaoru Hiramatsu—An Augmented Web Spac for Digital Cities—Applications and the Internet—Proceedings 2001 Symposium—Jan. 2001—pp. 105-112.

* cited by examiner

CREATING A VIRTUAL LINK BETWEEN A PHYSICAL LOCATION AND ITS WEB REPRESENTATION

BACKGROUND OF THE INVENTION

1. Field of the Invention

The present invention pertains to Internet and World Wide Web ("WWW"). More particularly, this invention relates to creating a virtual link between a three-dimensional ("3-D") physical location (or entity) and its web representation for fast and convenient web navigation without employing any physical object to host the link at the physical location.

2. Description of the Related Art

As is known, the world we live in is a physical world that is formed by physical entities such as people, places, and things (or objects). For example, a bookstore is a place. So is a tourist attraction, a museum, an exhibition hall, a conference room, or a home. A book in a bookstore, a painting in a museum is a thing. Likewise, a TV in a house is a thing. A bus stop can be referred to as a place.

With rapid growth of the Internet and widespread use of the Web (i.e., WWW), more and more physical entities (e.g., restaurants, hotels, tourist attraction spots) have their own web pages. This form of representation for the physical entities is typically referred to as non-physical or virtual representation. In this case, each physical entity can have one or more web pages. In addition, each web page can also represent one or more physical entities. These web pages use text, audio, video, and/or images to describe or illustrate their respective physical entities. The web pages may also provide services (e.g., e-commerce) for their physical entities. A person can simply go to the web pages of a physical entity to get information about the physical entity, or to conduct business transaction with the physical entity (i.e., on-line transaction or e-commerce). These web pages form the virtual world or cyberspace of the physical world. The web representation allows the physical entities to become more useful, convenient, and accessible. For example, instead of physically posting, at a particular bus stop, the arrival and departure schedules of various buses at that particular bus stop, the bus stop is equipped with its own web page which lists all the arrival and departure times so customers can access the information anywhere and anytime so long as they have the web address of the web page. The web page is also automatically updated in real time, thus avoiding the need for the employees of the bus company to physically post any change of the posted schedule. This provides people with accurate information cost-effectively and efficiently. As a further example, a restaurant or hotel may have a web page that publishes its offering and prices. The restaurant may even allow on-line reservation and/or take-out orders. The hotel may allow on-line booking. The web page might also provide easy email access for asking questions.

However, although a physical entity in real world may have its web-based representation, the two are not tightly connected. This means that there is no means for bridging the two worlds together. In other words, this prior art structure does not provide means for linking people who are interested in a physical entity to its web representation. For a person to find the right web page of a physical entity, the person either has to memorize the web address of the web page, or has to find the web page through searching and browsing the Web. This causes difficulty and inconvenience for the users to access those web pages. The inconvenience has increasingly become obvious because the Web has now grown to contain millions of millions of web sites and/or web pages.

This problem is also amplified by the fact that more and more people can access the Web through their mobile devices. As we know, with the increased availability of highly functional portable or mobile devices and deployment of wireless networking options, more and more people are always connected to the Web. Wherever they are, they have ready access to the virtual world through their mobile browser.

Prior solutions have been proposed to solving the problem. One prior solution is shown in FIG. 1. As can be seen in FIG. 1, a physical entity 11 has its web page 12. A web address or URL (Universal Resource Locator) beacon 14 is physically placed adjacent to the physical entity 11. The beacon 14 stores the web address of the web page 12 of the physical entity 11. The beacon 14 also transmits or broadcast the web address of the web page 12 so that any user with a beacon receiving device (e.g., the client system 20) can receive the web address of the web page 12 of the physical entity 11 when the user with the beacon receiving device is near the physical entity 14. Thus, the beacon 14 provides the linking of between the physical entity 11 and its web representation (i.e., web page 12) such that easy and quick navigation of the web can be achieved.

However, disadvantages are still associated with such prior arrangement. One disadvantage is that the URL beacon is a physical thing that must be physically placed adjacent the physical entity or location. If the web address of the physical entity is changed, the URL beacon must be updated on the site unless the beacon is connected via a network. On-site maintenance is also required for the installed beacon. For example, if the beacon is damaged or broken, a person must be sent to the site to fix or replace the beacon. If the beacon is powered by battery, the battery must be periodically replaced.

In addition, the physical beacon typically has a very limited transmission range. A user with a beacon receiver must almost be at the location of the physical entity to receive the beacon transmission of the stored web address. If the user is only in the vicinity, but not at the location, the user typically does not receive the beacon transmission.

SUMMARY OF THE INVENTION

One feature of the present invention is to provide a virtual linkage between a 3-D (three-dimensional) physical location or entity and its related web representation in order to allow for easy, quick, and convenient web navigation.

Another feature of the present invention is to link the virtual world (e.g., WWW) with the 3-D physical world with minimized physical effort.

A further feature of the present invention is to link a web page with a 3-D physical entity or location without the need to consider any physical constraints of the linkage.

Below described is a virtual beacon creator system for creating a link between a physical location and its web page. The system includes a user interface that receives user input of positional data of the physical location and a web address of the web page. An association module is then coupled to the user interface to create the link by creating an electronic file containing the positional data and the web address such that a person with a receiver system near the physical location can receive the electronic file to access the web page without browsing. This makes the link a virtual link which is not physically located at the physical location.

A system for virtually posting, at a physical location, a web address of a web page associated with the physical location is also described. The system includes a virtual link creator that creates an electronic file that contains positional data of the physical location and the web address. The system also includes a virtual link transmission system that receives the electronic file and transmits the electronic file to any receiver system at or near the physical location via a wireless network such that the web address of the web page is virtually posted at the physical location without employing a physical object to host the web address at the physical location.

A web navigation system is also described. The web navigation system includes a virtual link creator that creates an electronic file that contains positional data of a physical location and a web address of a web page associated with the physical location. A virtual link server system receives the electronic file. The server system can transmit the electronic file to any remote receiver system near the physical location via a communication network. A receiver system, capable of communicating with the server system and accessing external Internet, receives the electronic file from the server system when the receiver system is near the physical location such that the web address of the web page is virtually posted at the physical location without employing a physical object to host the web address at the physical location.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
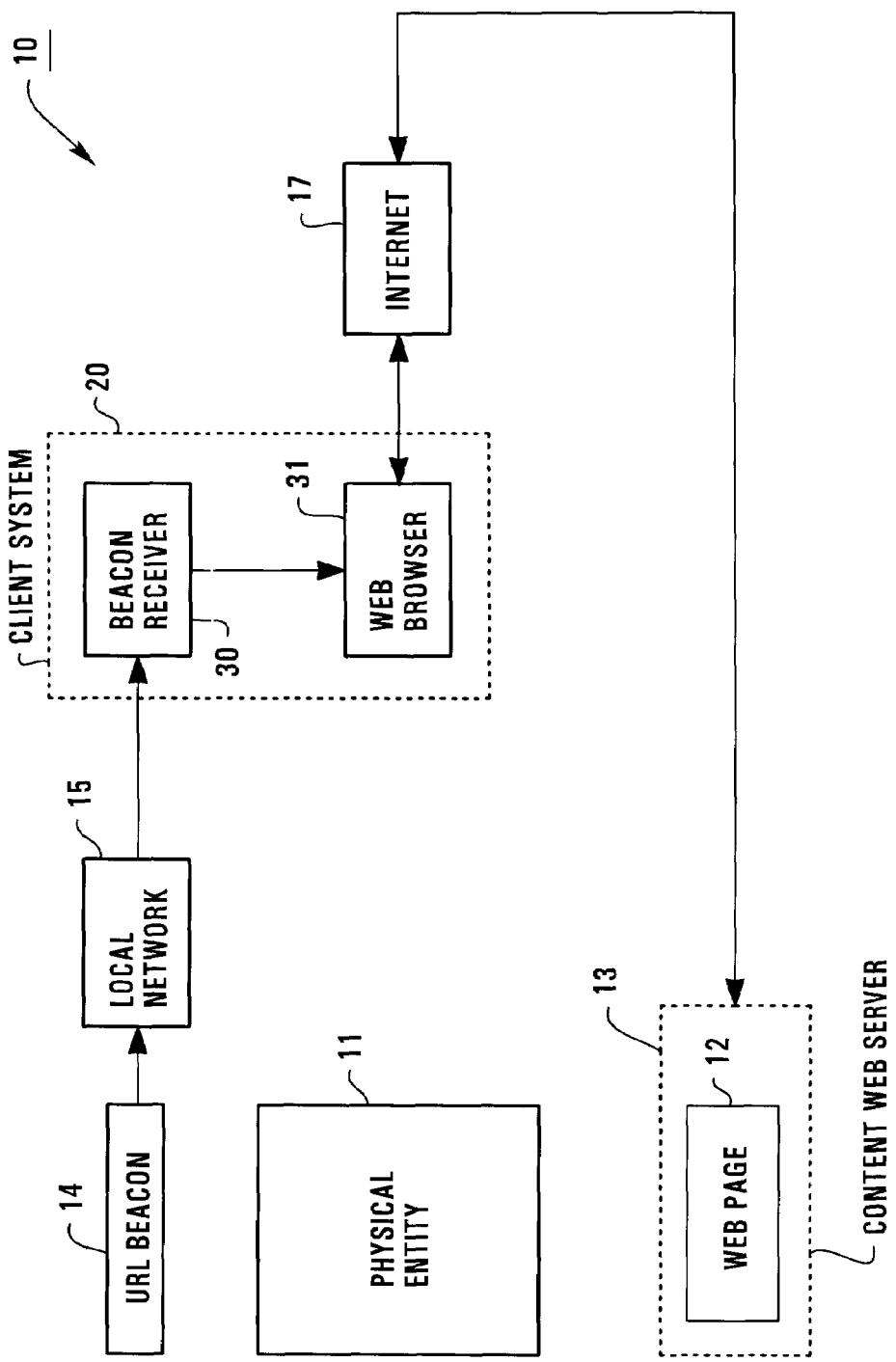
FIG. 1 shows a prior art web navigation scheme using a physical beacon adjacent to a physical entity to bridge virtual and physical worlds.
Figure 2:
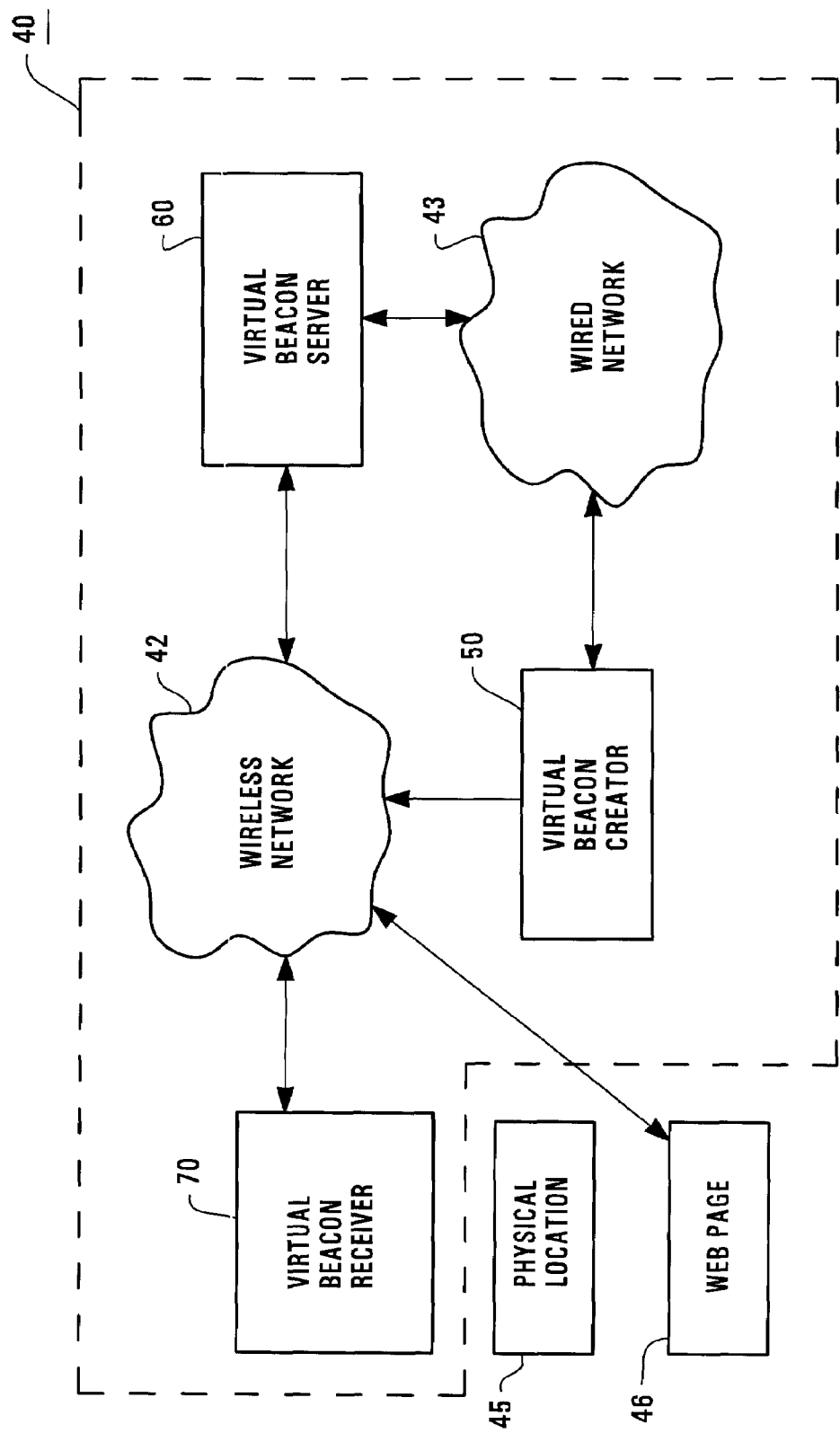
FIG. 2 shows a web navigation system that implements one embodiment of the present invention, wherein the system includes a virtual beacon creator, a virtual beacon server, and a virtual beacon receiver.

FIG. 2 shows a web navigation system 40 that implements one embodiment of the present invention. The web navigation system 40 includes a virtual beacon creator 50, a virtual beacon server 60, and a virtual beacon receiver 70. A wireless network 42 is used for communications among the above mentioned systems 50, 60, and 70. In addition, a wired network is used for communication between the virtual beacon creator 50 and the virtual beacon server 60.

The virtual beacon creator 50 can also be referred to as a virtual link creator. The virtual beacon server can also be referred to as a virtual link server. In addition, the virtual beacon receiver 70 can be referred to as a virtual link receiver or a receiver.

FIG. 2 also shows a physical location 45 and a web page 46 hosted in a content web server (not shown). The web page 46 can be accessed via the wireless network 42 by the virtual beacon receiver 70. This means that the virtual beacon receiver 70 has Internet access capability. The web page 46 is related to the physical location 45. This means that the physical location 45 is represented in the virtual world by the web page 46. Alternatively, the physical location 45 has two or more web pages and the web page 46 represents two or more physical locations.

In accordance with one embodiment of the present invention, the web navigation system 40 bridges the physical real world and the virtual world together such that easy, quick, and convenient web navigation is achieved with minimized physical effort for the bridging. The web navigation system 40 achieves this by allowing the web address of the web page 46 for the physical location 45 to be virtually posted at the physical location 45 without employing any physical object (e.g., a physical beacon, a display screen, or a poster) to post the web address at the physical location 45. This means that the web navigation system 40 provides a virtual beacon (or virtual link) (i.e., the virtual beacon 91 in FIG. 5) that functions to post, display, or broadcast the web address of the web page 46 at the physical location 45.

Hereinafter, the term "physical beacon" refers to an electronic device or module that stores a web address and can transmit or broadcast the stored web address. The term "virtual beacon" or "virtual link", however, does not refer to any physical object such as the physical beacon. Instead, this term refers to an electronic file that contains the web address. The electronic file, however, serves the similar function as the physical beacon. The virtual beacon or virtual link can also be referred to as a web-sign.

In addition, the term "physical location" refers not only to a geographical location, but to a physical entity as well. As described above, a physical entity can be a bookstore, a museum, a conference room, a hotel room, or an item displayed at the bookstore or museum. The physical entity can also be a convention center, a car displayed at the convention center, or a bus terminal or stop.

Although the term "physical location" refers to both the geographical location as well as physical entity, there is no confusion because every geographical location has a unique positional data (e.g., latitude is "53.456789" and longitude is "123.456789"). This is also true for any physical entity located at a geographical location. In this case, the physical entity assumes the positional data of the geographical location at which the physical entity is located. This allows the term "physical location" to refer to either the geographical location or a physical entity at a geographical location.

The physical location 45 can be referred to using the street address (e.g., 1501 Page Mill Road, Palo Alto, Calif.), or the unique positional data. But if the street address is used to refer to the location 45, map data should be stored to convert the street address into the actual positional data.

As will be described in more detail below, the virtual beacon creator 50 creates the virtual beacon 91 for the physical location 45. The virtual beacon 91 is essentially a location-based electronic file (i.e., the file 92 in FIG. 5). This means that the electronic file 92 contains the positional data of the physical location 45 and the web address of the web page 46. In addition, other data (e.g., access range, direction, name of the web address, time range during which the virtual beacon is active) may also be included in the electronic file 92 that forms the virtual beacon 91. The location-based electronic file 92 is then sent by the virtual beacon creator 50 to the virtual beacon server 60 via either the wireless network 42 or the wired network 43. Each of the networks 42 and 43 employs an open standard communication protocol (e.g., the Hyper Text Transport Protocol (HTTP)) for communication. Thus, each of the networks 42-43 is an Internet network.

The virtual beacon server 60 then sends the virtual beacon electronic file 92 to any external receiver system (e.g., the receiver system 70) via the wireless network 42 when the external receiver system is at a particular location and sends a request for all virtual beacon files that have positional data indicating locations that are near the location at which the receiver system is currently located. For example, when the receiver system 70 is near the physical location 45 and requests to receive all virtual beacon files that contain positional data indicating locations that are near the location at which the receiver system 70 is located, the virtual beacon server 60 will send the virtual beacon electronic file 92 to the receiver system 70. The receiver system 70 then uses the web address contained in the virtual beacon electronic file 92 to access the web page 46, thus allowing the web address of the web page 46 to be virtually posted at the physical location 45 without employing any physical object to host the web address at the physical location 45. This makes the virtual beacon 91 a virtual link or virtual beacon which is not physically located at the physical location 45. The web navigation system 40 will be described in more detail below, also in conjunction with FIGS. 2-9.

Figure 5:
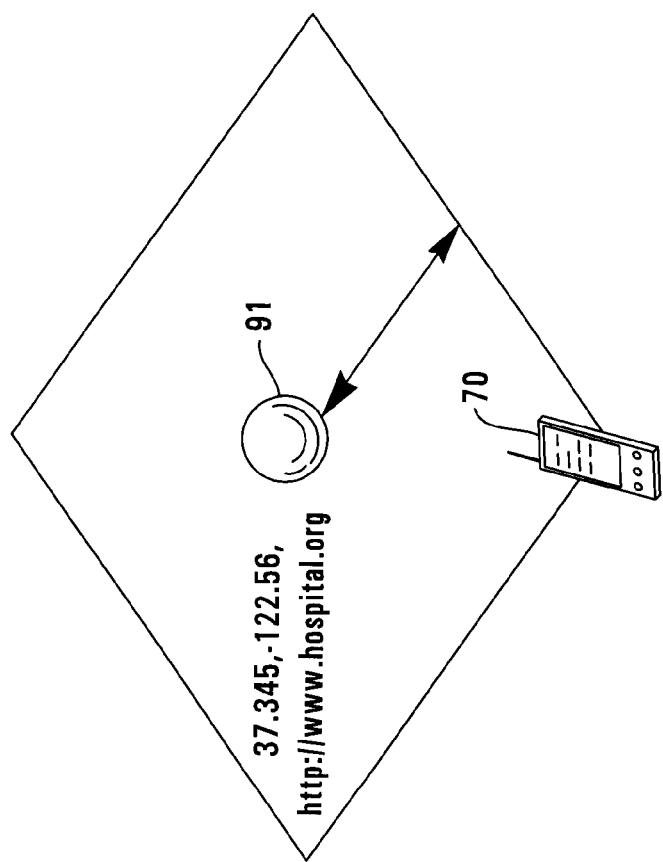
FIG. 5 illustrates one exemplary virtual beacon created by the virtual beacon creator of FIGS. 2-4.

As can be seen from FIGS. 2 and 5, the virtual beacon creator 50 creates the virtual beacon 91 by creating the electronic file 92 (both shown in FIG. 5) for the physical location 45. As described above, the virtual beacon 91 is not a physical object, but rather a location-based electronic file (i.e., the electronic file 92) that contains data. The data contained in the virtual beacon electronic file 92 include a positional data of the physical location 45 (e.g., latitude="37.345" and longitude="−122.56"). In addition, the data contained in the electronic file 92 also include an access range data (e.g., range=2000 feet), a tag or label data (e.g., <label>=the hospital). Moreover, other data may also be included. For example, the data in the electronic file 92 may include a directional data specifying the direction or orientation of the beacon projection of the virtual beacon 91, as well as time range data indicating the times during which the virtual beacon 91 is active. The beacon projection means the direction at which the virtual beacon electronic file 92 can be received by an external receiver system (e.g., the receiver system 70) at or near the location of the virtual beacon 91. These other data can be collectively referred to as control data, property data, or control information.

Figure 3:
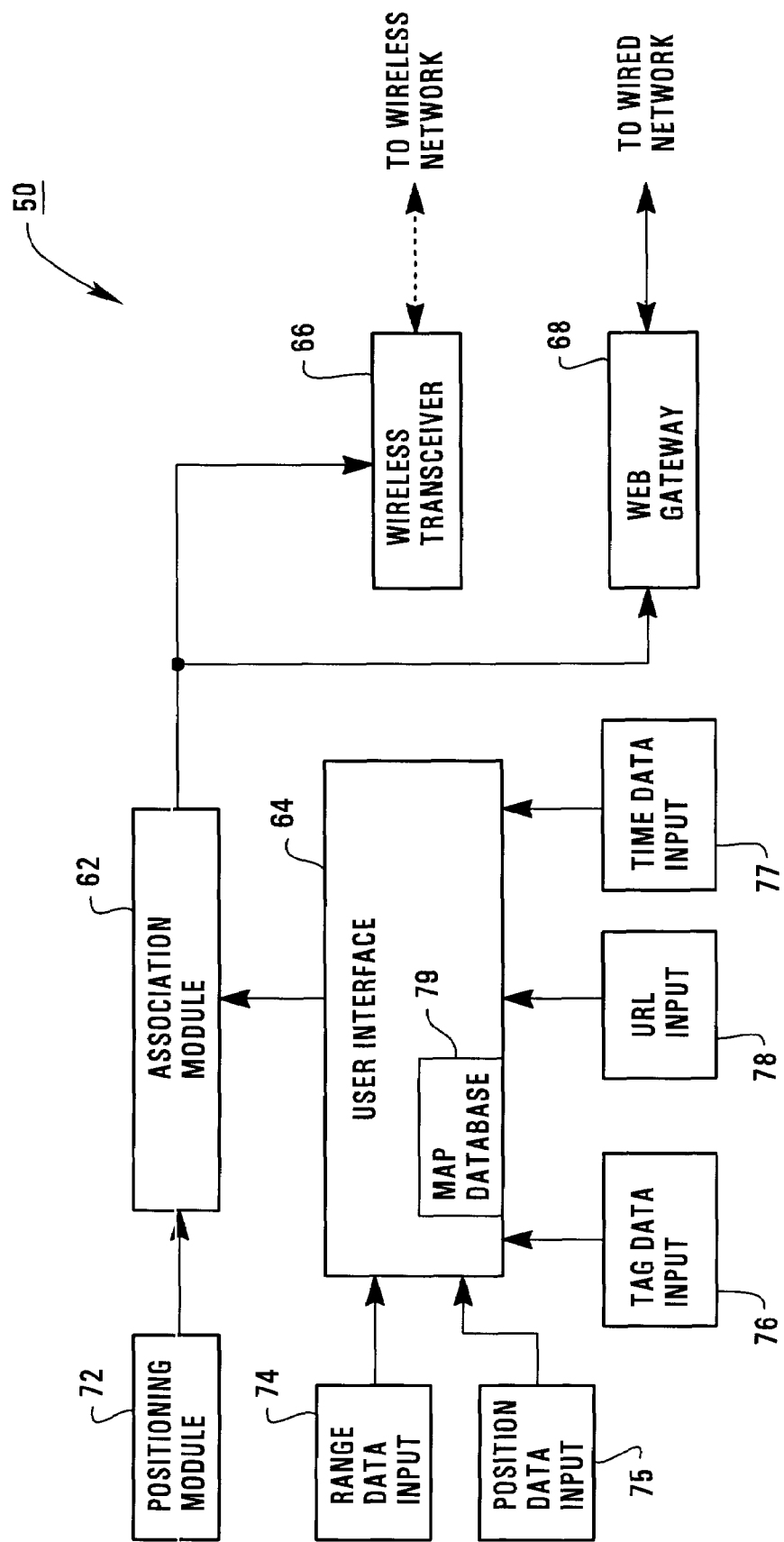
FIG. 3 is a block diagram showing the structure of the virtual beacon creator of FIG. 2.

In one embodiment, the virtual beacon creator 50 of FIG. 2 can be implemented by a computer system with communication functions with external networks. In other embodiments, the virtual beacon creator 50 can be implemented by software, hardware, or firmware. FIG. 3 shows the structure of the virtual beacon creator 50, which will be described in more detail below.

In FIG. 3, the virtual beacon creator 50 includes an association module 62, a user interface 64, a wireless transceiver 66, a web gateway 68, and a positioning module 72. The user interface 64 is used to interact with the user of the virtual beacon creator 50, and to receive user inputs 74-78 of data that will be used to form the virtual beacon electronic file 92. As can be seen from FIG. 3, the user inputs include a range data input 74, a position data input 75, a tag/label data input 76, a time data input 77, and a web address (i.e., URL) data input 78. In addition, the user interface 64 may also include a map data database 79. This database 79 is used when the position data input 75 is actually an address input (e.g., 3000 Hanover Street, Palo Alto, Calif.). In this case, the user interface 64 accesses the database 79 to convert the address input into the positional data (e.g., latitude="12.345" and longitude="89.123").

Figure 4:
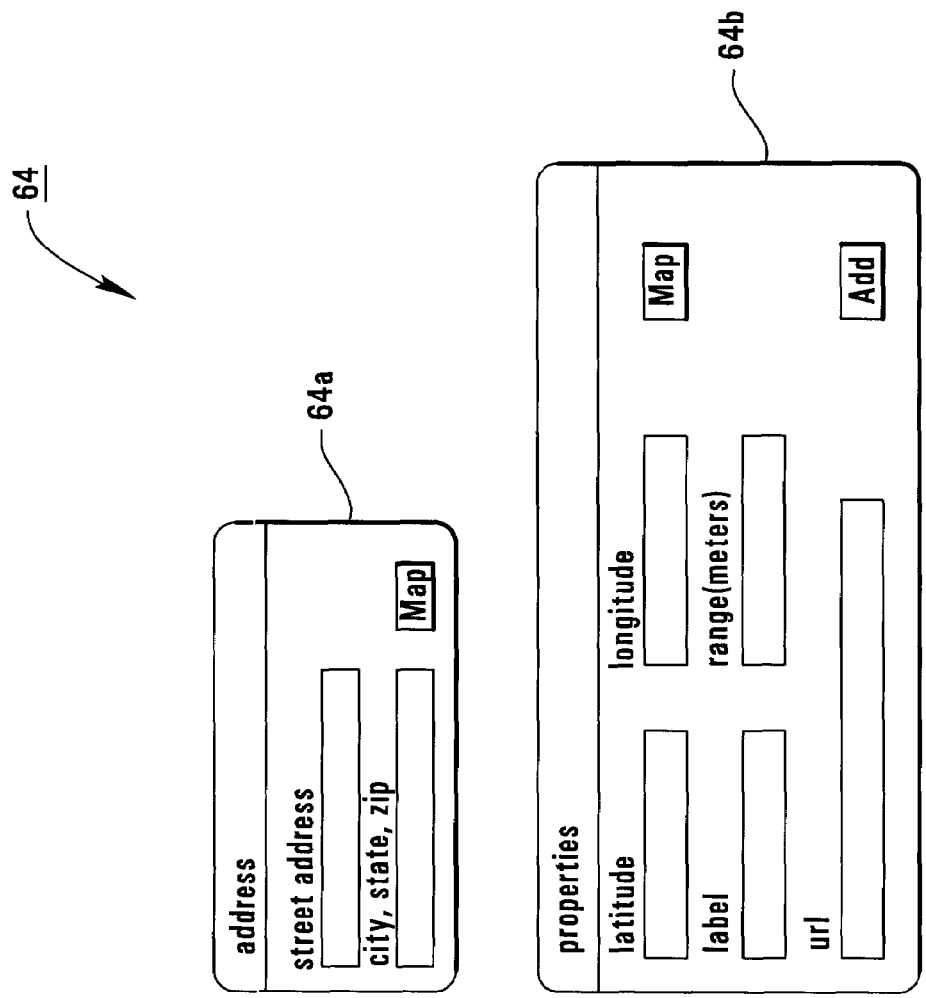
FIG. 4 shows the user interface of the virtual beacon creator of FIG. 3 for receiving user inputs.

FIG. 4 shows one example of the user interface 64. As can be seen from FIG. 4, the user interface 64 provides the interface (i.e., 64*a*) for address input and the interface (i.e., 64*b*) for positional data input. The interface 64*b* also includes fields for other user data inputs (e.g., range, time, label, web address).

Referring back to FIG. 3, the association module 62 receives all the user inputs 74-78 from the user interface 64. The association module 62 then forms the electronic file 92 (FIG. 5) that represents the virtual beacon 91. The electronic file 92 contains (1) the positional data of the physical location 45 (FIG. 2) at which the virtual beacon 91 is created or specified and (2) the control data (e.g., the web address of the web page 46 (FIG. 2) associated with the physical location 45 (FIG. 2), the access range of the virtual beacon 91, and the tag/label of the web address, etc.). The association module 62 can be implemented using known technology.

The positioning module 72 is employed to provide the positional data of the current position of the creator 50. This allows the association module 62 to require no positional data input from the user interface 64 when creating a virtual beacon file. In this case, the user of the creator 50 only needs to indicate that the virtual beacon takes the current position of the creator 50. In one embodiment, the positioning module 72 is a GPS (Global Positioning System) receiver module. Alternatively, the positioning module 72 can be implemented using other known technology.

Referring to FIGS. 2-3 and 5, the location-based electronic file 92 is then sent by the virtual beacon creator 50 to the virtual beacon server 60 via either the wireless network 42 or the wired network 43. Each of the networks 42 and 43 employs an open standard communication protocol (e.g., the Hyper Text Transport Protocol (HTTP)) for communication. Thus, each of the networks 42-43 is an Internet network. This means that the virtual beacon electronic file 92 received by the server 60 from the creator 50 are in the XML (Extended Markup Language) format. Alternatively, other known web data formats may be employed for the virtual beacon electronic file 92.

The transmission from the virtual beacon creator 50 is dependent on the connection of the creator 50 with the external server 60. If the creator 50 is connected to the wired network 43, then the web gateway 68 is used to transmit the electronic file 92 created by the creator 50. If the creator 50 is connected to the wireless network 42, then the electronic file 92 is transmitted by the wireless transceiver 66. If the creator 50 is connected to both networks 42-43, then the electronic file 92 can be sent by either network. The wireless transceiver 66 can be implemented using known technology and the web gateway 68 can be implemented using known technology.

Referring back to FIG. 2, when the virtual beacon server 60 receives the location-based electronic file 92 representing the virtual beacon 91 (both shown in FIG. 5) for the physical location 45, the server 60 stores the electronic file 92. When requested, the server 60 sends the electronic file 92 to the requesting receiver (e.g., the receiver 70). The server 60 sends the virtual beacon files it has stored either in the web format (e.g., XML format) or in the email format. Thus, the server 60 is basically a combination of a web server and an email server. The server 60 has a web address so that remote systems having web browsing capability can access the server 60. In addition, the server 60 also has an email address. The structure of the server 60 is shown in FIG. 6, which will be described in more detail below.

Figure 6:
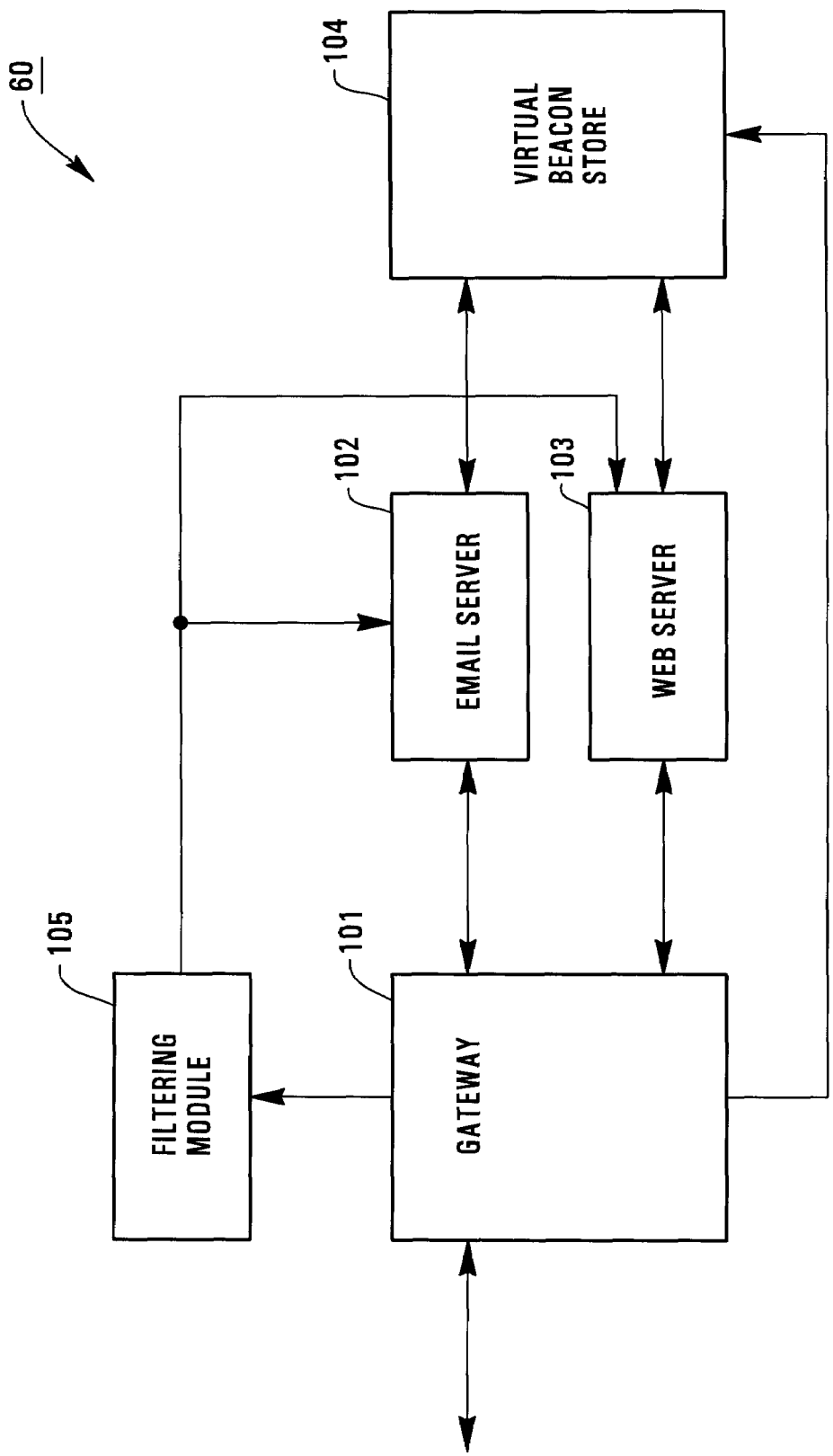
FIG. 6 shows the structure virtual beacon server of FIG. 2.

In FIG. 6, the server 60 includes a gateway 101, an email server 102, a web server 103, a virtual beacon store 104, and a filtering module 105. Alternatively, the server 60 can function without some of the above-mentioned modules. For example, the server 60 may not have the filtering module 105 or the email module 102. The gateway 101 is used to interface the server 60 with the networks 42 and 43 (FIG. 2). Thus, the gateway 101 is also an Internet-enabled gateway.

The email server 102 is used to send virtual beacon electronic files (e.g., the file 92 of FIG. 5) to remote receivers (e.g., the receiver 70 of FIG. 2). The email server 102 has an email address and can send the virtual beacon files in e-mail format. The email server 102 can be implemented using known technology. The email server 102 is typically used to delivery the virtual beacon files stored in the store 104 to a remote receiver (e.g., the receiver 70 of FIG. 2) instantly (i.e., without waiting for the receiver to request such virtual beacons). The server 102 can also send the virtual beacon files stored in the store 104 to a remote receiver when the receiver requests such files.

The web server 103 is used to delivery the virtual beacon files stored in the store 104 to a remote receiver (e.g., the receiver 70 of FIG. 2) when the receiver requests such files (i.e., on-demand delivery). The web server 103 also includes a web address so that external systems can access the web server 103 for the virtual beacon files stored in the store 104. The web server 103 can be implemented using known technology.

During operation, the gateway 101 receives external location-based virtual beacon files (e.g., the electronic file 92 of FIG. 5) from external virtual beacon creators (e.g., the creator 50 of FIG. 2). The gateway 101 then sends the file to the virtual beacon store 104 where the file is stored.

When the gateway 101 receives a request from an external receiver (e.g., the receiver 70 of FIG. 2) for virtual beacon files with positional data indicating positions that are in the vicinity of the position of the requesting receiver, the gateway 101 will cause either the email server 102 or the web server 103 to reply. Which one of the servers 102-103 should be engaged to reply depends on the request. If the request is an email request, then the email server 102 is engaged. Otherwise, the web server 103 is used.

In addition, the email server 102 is also used to perform the instant delivery service of the virtual beacon files. In this case, the email server 102 needs to know the recipient's email address (i.e., subscription). In this case, as soon as the gateway 101 receives a new file for a new virtual beacon, the email server 102 checks to see if it needs to send the newly created virtual beacon to one or more of its existing subscribers.

The filtering module 105 is used to filter out the virtual beacon files that are not supposed to be sent out. The filtering module 105 does this by using the access range of the requesting receiver and the projection range (or access range) of a virtual beacon to determine if the virtual beacon file needs to be transferred. For example, if a virtual beacon file specifies a projection (or access) range of fifteen meters while the request from the requesting receiver (e.g., the receiver 70) specifies a range of three meters as vicinity, and if the virtual beacon specifies a location that is two meters from the current position or location of the requesting receiver, then the virtual beacon file will be transferred to the requesting receiver without being filtered out by the filtering module 105. The filtering module 105 may also implement different filtering schemes. Alternatively, the server 60 does not include this module.

Referring back to FIG. 2, the virtual beacon receiver 70 is employed to receive the virtual beacons (e.g., the virtual beacon 91 of FIG. 5) from the server 60. The receiver 70 is a portable or mobile electronic device with wireless (and/or wired) Internet access functionality. In one embodiment, the receiver 70 is a PDA (Personal Digital Assistant) or a personal organizer. In another embodiment, the receiver 70 is a palm-top computer or a mobile computer. Alternatively, the receiver 70 can be any kind of information appliance, or any kind of small portable handheld electronic device or appliance which has limited processing, storage, and display resources (e.g., a watch, a cellular phone, or a pager). The operation of the virtual beacon receiver 70 is as follows.

When the virtual beacon receiver 70 is at a particular physical location (e.g., a bank, a convention center, a bus stop, or simply at a corner of a street in a town) and wants to have all the virtual beacons located in the vicinity of the receiver 70, the virtual beacon receiver 70 accesses the virtual beacon server 60 via the wireless network 42. For example, when the virtual beacon receiver 70 is at or near the physical location 45 and wants to know all the virtual beacons in the vicinity of the current location at which the receiver 70 is located, the virtual beacon receiver 70 sends a request to the virtual beacon server 60 and receives all the virtual beacon files that contain the positional data indicating positions that are within the vicinity of the current location of the receiver 70. The range of vicinity (i.e., access range of the receiver 70) is specified by the receiver 70 in its request to the virtual beacon server 60. For example, the receiver 70 can specify an access range of fifteen meters or thirty meters. This means the vicinity is fifteen meters and any virtual beacon located within fifteen meters from the current location of the receiver 70 will be sent from the sender 60 to the receiver 70. The vicinity and access range will be described in more detail below, in conjunction with FIG. 7.

Figure 8:
FIG. 8 shows one example of the virtual beacons received and displayed on the user interface of the virtual beacon receiver of FIGS. 2 and 7.

The receiver 70 then displays all the virtual beacons received from the server 60. FIG. 8 shows one example of the displayed virtual beacons of the receiver 70. The virtual beacon files sent from the server 60 to the receiver 70 are in the XML (Extensible Markup Language) data format. If the server 60 sends the virtual beacon files through its e-mail server (i.e., the email server 102 of FIG. 6), then the files are in the email format.

As described above, the wireless network 42 is a wireless Internet network that allows the virtual beacon receiver 70 to communicate with the virtual beacon server 60 using an open standard communication protocol (e.g., HTTP or email protocol). Thus, the communication between the server 60 and the receiver 70 follows the traditional Internet or email communication. This means that the server 60 has a web address or email address and the receiver 70 includes a web browsing capability or email capability. The receiver 70 accesses the server 60 using a web browser and the web address of the server 60. If email is used for the communication, the receiver 70 accesses the server 60 using its email software and the email address of the server 60.

The receiver 70 accesses the server 60 with a request (not shown). In the request, the receiver 70 specifies its current position by including the positional data of the current position of the receiver 70 in the request. In addition, the receiver 70 also specifies, in the request, the virtual access range of the receiver 70. This limits the range or distance that the receiver 70 can receive a location-based virtual beacon file. For example, if a virtual beacon file specifies a location that is beyond the access range of the receiver 70 from the current location of the receiver 70, the receiver 70 will not receive that virtual beacon file from the server 60. But if the virtual beacon file specifies a location that is within the access range of the receiver 70 from the current location of the receiver 70, the receiver 70 will receive that virtual beacon file from the server 60. Alternatively, the request does not specify the virtual access range of the receiver system 70. In this case, the range data is stored in the receiver 70 and the filtering process takes place within the receiver 70 before the receiver 70 displays the received virtual beacon files.

The concept of access range is introduced to limit the traffic between the server 60 and the receiver 70 along the network 42. As is known, physical beacons have physical constraints and that effectively limits access range. While we would like a system where users are not limited by the physical constraints we still need some constraints. Otherwise the system would cause users to see a very large number of virtual beacons, causing extreme cognitive overhead.

In the web navigation system 40, since a virtual beacon is a virtual entity and therefore we need the constraint of a virtual access range. The user should only be able to experience the virtual beacons in his digital horizon. We define a digital horizon as a set of all the virtual beacons that are "activated" as a result of the user being in their range. While range is the property of an individual virtual beacon, the digital horizon is the temporal and spatial property of an individual user.

Figure 7:
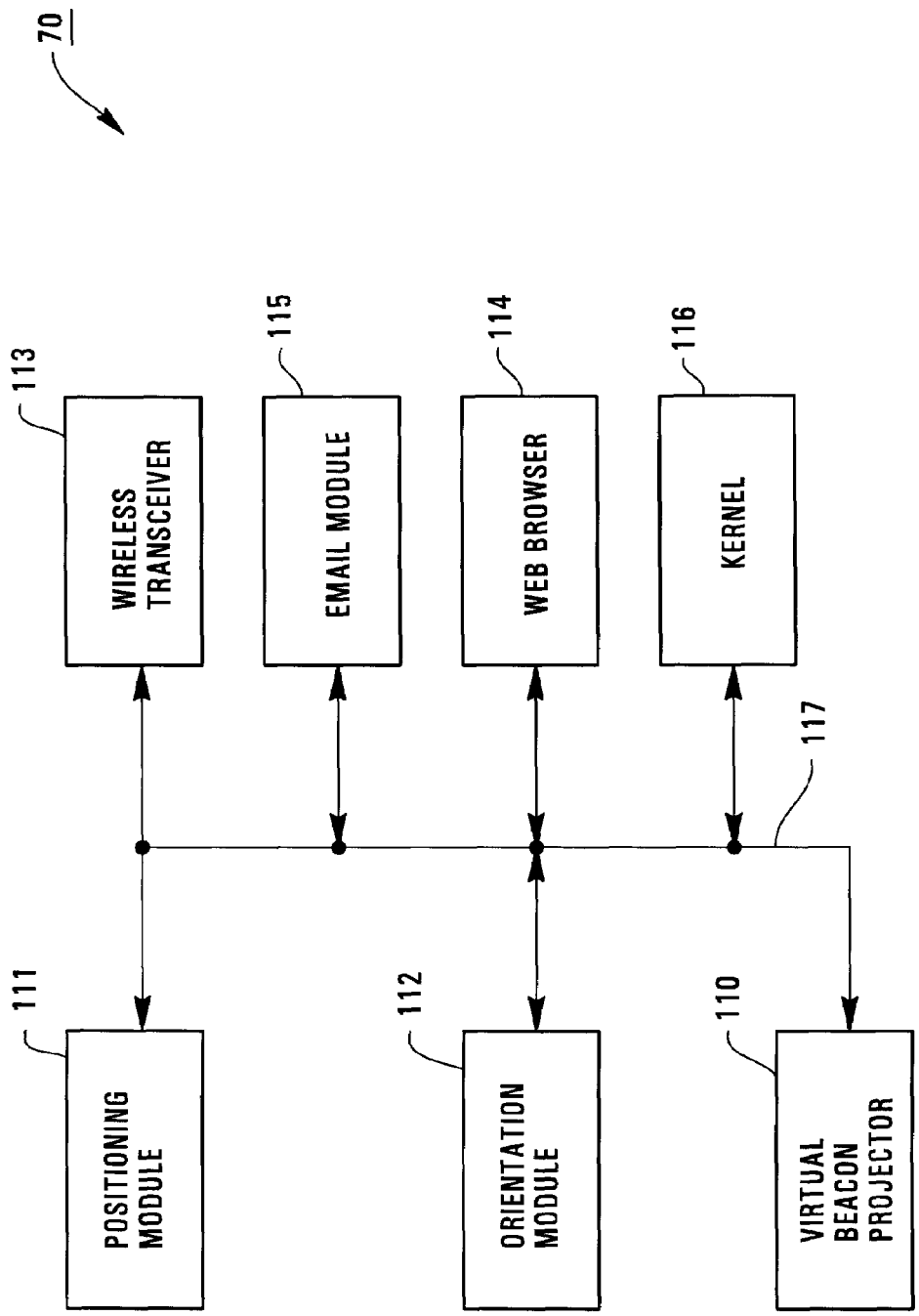
FIG. 7 shows the structure of the virtual beacon receiver of FIG. 2.

FIG. 7 shows the structure of the virtual beacon receiver 70 of FIG. 2. As can be seen from FIG. 7, the receiver 70 includes a positioning module 111, an orientation module 112, a wireless transceiver 113, a web browser 114, an email module 115, a kernel 116, and a virtual beacon projector 110. These modules are connected together via an internal bus 117.

The positioning module 111 provides the positional data of the current position of the receiver 70. In one embodiment, the positioning module 111 is a GPS receiver module. Alternatively, the positioning module 111 can be implemented using other known technology.

The orientation module 112 determines the orientation of the receiver 70. This means that the orientation module 112 determines the direction or orientation the receiver 70 is currently facing. In one embodiment, the orientation module 112 is a magnetometer. In another embodiment, the orientation module 112 is a magnetic compass.

The wireless transceiver 113 is used to send requests for virtual beacons to the remote server 60 (FIG. 2) and to receive virtual beacon electronic files from the server 60 via the network 42 (FIG. 2). The transceiver 113 can be implemented using any known communication technology and is network-specific. Thus the transceiver 113 will not be described in more detail.

The web browser 114 is used to generate the request and to use the request to access the remote server 60. In other words, the web browser 114 is used to control communication between the server 60 and the receiver 70. The web browser 114 can also be implemented using known technology. Like the web browser 114, the email module 115 is used to generate the request in email format and to use the request to access the remote server 60. The email module 115 can also be implemented using known technology.

The kernel 116 is used to communicate and control power management and other features of the hardware of the receiver 70. It also acts as an interface, abstracting the hardware from the other components. This is important as different hardware configuration could be used for different application. The kernel 116 includes an algorithm to calibrate the orientation module 112 and also to process its results into heading, correcting for inclination and declination. The other important functionality of the kernel 116 includes keeping the onboard cache refreshed. On the users demand, the kernel 116 queries the positioning module 111 for the current location, ambiguates it by truncating the trailing digits, and uses the data to queries the server 60 (FIG. 2). The response—WsML—is stored in the internal buffer of the virtual beacon projector 110.

The main function of the projector 110 is to display the received virtual beacon files. FIG. 8 shows one example of the display. As can be seen from FIG. 8, each virtual beacon is displayed with the location information with respect to the current location of the receiver 70. The structure of the projector 110 is shown in FIG. 9, which will be described in more detail below.

Figure 9:
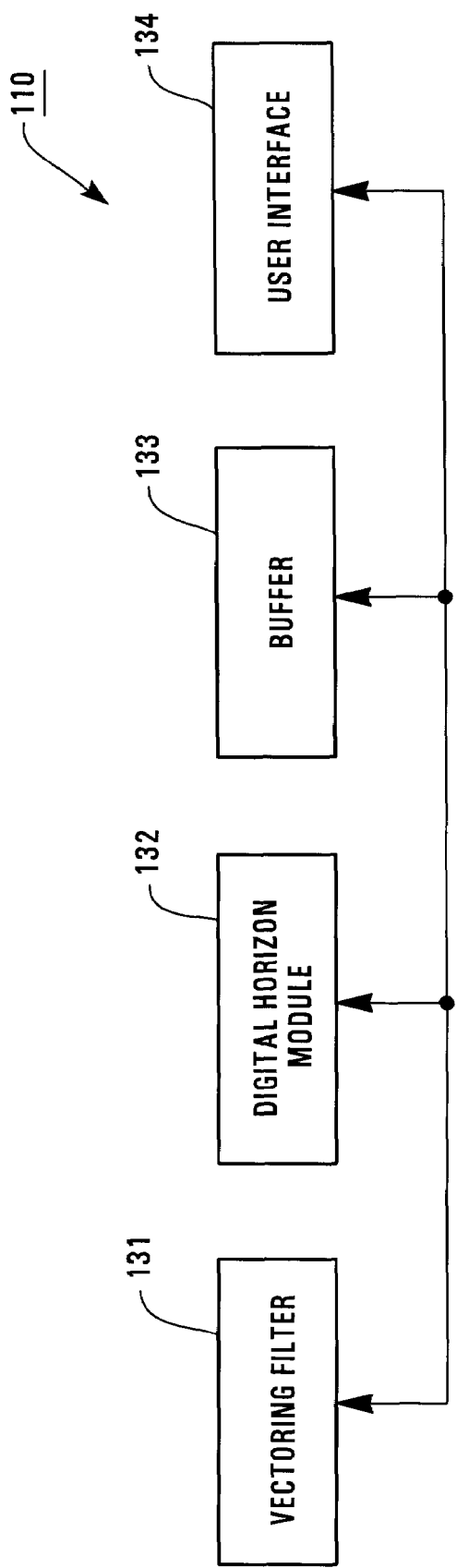
FIG. 9 shows the structure of the virtual beacon projector of FIG. 7.

Referring to FIG. 9, the virtual beacon projector 110 includes a vectoring filter 131, a digital horizon module 132, a buffer 133, and a user interface 134. The user interface 134 is employed to allow the user of the receiver to communicate with the projector 110. For example, when the projector 110 displays a number of virtual beacons such as those shown in FIG. 8 and the user wants to access the web page of one of them, the user can do so by clicking on one of the listed hyperlinks. The user interface 134 also includes a display (not shown in FIG. 9). The user interface 134 can be implemented using known technology and will not be described in more detail below.

The digital horizon module 132 is used to restrict the virtual access range of the receiver 70 (FIGS. 2 and 7). This limits the range or distance that the receiver 70 can receive a location-based virtual beacon file. As described above, the user should only be able to experience the virtual beacons in his digital horizon. We define a digital horizon as a set of all the virtual beacons that are "activated" as a result of the user being in their range. While range is the property of an individual virtual beacon, the digital horizon is the temporal and spatial property of an individual user. Thus, the range data is stored in the buffer 133 and the filtering process takes place within the receiver 70 before the receiver 70 displays the received virtual beacon files. Alternatively, the digital horizon module 132 is not included in the projector 110 and the filtering process takes place in the server 60 (FIG. 2).

The vectoring filter 131 is used to filter the virtual beacons that are in the direction pointed by the receiver 70 (FIGS. 2 and 7) and display them on the user interface 134. The kernel 116 of FIG. 7, in response to changes in the magnetometer readings of the orientation module 112 of FIG. 7, invokes the vectoring filter 131.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A system for creating a link between a physical location and its web page, comprising:
    a user interface that receives positional data related to a physical location of a receiver system;
    a virtual beacon comprising an electronic file containing positional data and a web address related to a physical location having a web page;
    an association module coupled to the user interface to create a link between the positional data related to the physical location of the receiver system and the virtual beacon comprising the electronic file containing the positional data and the web address related to the physical location having the web page such that the receiver system near the physical location having the web page can receive the electronic file to access the web page without browsing, wherein the virtual beacon is not a physical object.

2. The system of claim 1, wherein the positional data received is in the form of address of the physical location and the user interface converts that into the positional data.

3. The system of claim 1, wherein the user interface also receives a range data that specifies access range from the physical location within which the receiver system can receive the electronic file.

4. The system of claim 1, further comprises a wireless transceiver that sends the electronic file wirelessly to a remote server system, wherein the remote server system stores the electronic file and sends the electronic file to the receiver system, wherein the system further comprises a web gateway that sends the electronic file to a remote server system via an external Internet.

5. The system of claim 1, wherein the user interface also receives a time data that indicates a range of times when the electronic file can be sent, and a tag data that indicates the name or label of the web address.

6. The system of claim 1, further comprising a positioning module that provides the positional data of the current position of the system.

7. A system for posting a web address of a web page associated with a physical location, comprising:
    a virtual link creator that creates a virtual beacon comprising an electronic file that contains positional data and a web address related to a physical location having a web page;
    a virtual link server system that receives the virtual beacon comprising the electronic file and transmits the electronic file to any mobile receiver system at or near the physical location related to the virtual beacon position via a communication network such that the web address of the physical location having the web page is virtually posted at the physical location having the web page via the virtual beacon without employing a physical object to host the web address.

8. The system of claim 7, wherein the virtual link creator further comprises
    a user interface that receives user input of the positional data of the physical location, the web address of the web page, and other property data, wherein the electronic file also includes the other property data;
    an association module that creates the electronic file that includes the positional data and the web address.

9. The system of claim 8, wherein the virtual link creator further comprises a wireless transceiver that sends the electronic file to the virtual link server system;
a web gateway that sends the electronic file to the virtual link server system via an external Internet when the virtual link server system is also coupled to the external Internet;
a positioning module that provides the positional data of the current position of the virtual link creator.

10. The system of claim 8, wherein the property data include a range data that specifies access range within which the receiver system can receive the electronic file when near the physical location, a time data that indicates a range of times when the electronic file can be sent, and a tag data that indicates the name or label of the web address.

11. The system of claim 7, wherein the virtual link server system only sends the electronic file to remote receiver systems that are at or near the physical location although the electronic file is not located adjacent to the physical location.

12. The system of claim 7, wherein the virtual link server system further comprises
    a store that stores the electronic file;
    an email server that sends the electronic file in email form;
    a web server that sends the electronic file in web page form;
    a gateway that interfaces with the external communication network to receive the electronic file, and interfaces with other communication networks to send the electronic file in the email or web page form.

13. The system of claim 12, wherein the virtual link server system further comprises a filtering module that receives, from the requesting receiver system, the positional data of the current position of the receiver system and a request for any electronic file with a positional data indicating a position at or near the current position of the receiver system, wherein the filtering module then causes all electronic files stored in the store with the positional data indicating a position at or near the current position of the receiver system to be sent via one of the email server and the web server to the requesting receiver system based on the range data of the respective electronic files.

14. The system of claim 13, wherein the filtering module does not cause any electronic file stored in the store with the positional data indicating a position not at or near the current position of the receiver system to be sent to the receiver system.

15. A web navigation system, comprising:
    a virtual link creator that creates a virtual beacon comprising an electronic file that contains positional data and a web address related to a physical location having a web page associated therewith;
    a virtual link server system that receives the virtual beacon comprising the electronic file, wherein the server system can transmit the virtual beacon comprising electronic file via a communication network;
    a receiver system having position data capabilities related to a current physical location of said receiver system, said receiver system capable of communicating with the server system and external Internet, said receiver system providing the position data to said server system and receiving the virtual beacon comprising the electronic file from the server system, said server system monitoring the position data from said receiver system and providing a virtual beacon comprising the electronic file and the web address when the receiver system is near the physical location such that the web address of the web page is virtually posted at the physical location without employing a physical object to host the web address at the physical location.

16. The system of claim 15, wherein the virtual link server system sends the electronic file to the receiver system when the receiver system informs the virtual link server system of its current position and when the virtual link server system determines that the receiver system is at or near the physical location by comparing the positional data of the current position of the receiver system with the positional data in the electronic file.

17. The system of claim 15, wherein the virtual link creator further comprises
a user interface that receives user input of the positional data of the physical location, the web address of the web page, and other property data, wherein the electronic file also includes the other property data;
an association module that creates the electronic file that includes the positional data and the web address;
a wireless transceiver that sends the electronic file to the virtual link server system;
a web gateway that sends the electronic file to the virtual link server system via an external Internet when the virtual link server system is also coupled to the external Internet;
a positioning module that provides the positional data of the current position of the virtual link creator.

18. The system of claim 17, wherein the property data include a range data that specifies access range within which the receiver system can receive the electronic file when near the physical location, a time data that indicates a range of times when the electronic file can be sent, and a tag data that indicates the name or label of the web address.

19. The system of claim 15, wherein the virtual link server system further comprises
a store that stores the electronic file;
an email server that sends the electronic file in email form;
a web server that sends the electronic file in web page form;
a gateway that interfaces with the external communication network to receive the electronic file from the virtual link creator, and interfaces with other communication networks to send the electronic file in the email or web page form to the receiver system;
a filtering module that receives, from the requesting receiver system, the positional data of the current position of the receiver system and a request for any electronic file with a positional data indicating a position at or near the current position of the receiver system, wherein the filtering module then causes all electronic files stored in the store with the positional data indicating a position at or near the current position of the receiver system to be sent via one of the email server and the web server to the requesting receiver system based on the range data of the respective electronic files.

20. The system of claim 19, wherein the filtering module does not cause any electronic file stored in the store with the positional data indicating a position not at or near the current position of the receiver system to be sent to the receiver system.

21. The system of claim 15, wherein the receiver system further comprises
a positioning module that determines the current position of the receiver system;
a wireless transceiver that sends a request for the electronic file to the virtual link server system, wherein the request includes the positional data of the current position of the receiver system, wherein the transceiver also receives the electronic file from the virtual link server system;
a virtual link projector that displays the names of the web addresses contained in all electronic files received from the virtual link server system;
a web access module that uses a selected web address to access the corresponding web page via the external Internet.

22. The system of claim 21, wherein the receiver system further comprises
an orientation module that determines the orientation of the receiver system, wherein the positional data of the current position of the receiver system includes the orientation of the receiver system;
a user interface that allows the receiver system to receive user input of (1) the positional data of the receiver system and (2) an access range data that specifies an access range of the receiver system in receiving electronic files.

23. The system of claim 22, wherein the virtual link projector further comprises
a display that displays the names of the web addresses in all electronic files received by the receiver system;
a digital horizon module that specifies the access range of the receiver system in receiving the electronic files;
a vectoring filter that uses the orientation from the orientation module to filter out electronic files within the access range but not in the direction pointed by the receiver system.

* * * * *